United States Patent
Yamazaki

(10) Patent No.: US 10,284,782 B2
(45) Date of Patent: May 7, 2019

(54) IMAGE STABILIZATION APPARATUS, CONTROL METHOD THEREOF, AND IMAGE CAPTURE APPARATUS

(71) Applicant: CANON KABUSHIKI KAISHA, Tokyo (JP)

(72) Inventor: Tatsuya Yamazaki, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/646,604

(22) Filed: Jul. 11, 2017

(65) Prior Publication Data
US 2018/0020164 A1    Jan. 18, 2018

(30) Foreign Application Priority Data
Jul. 13, 2016  (JP) .................. 2016-138903

(51) Int. Cl.
*H04N 5/232*  (2006.01)

(52) U.S. Cl.
CPC ..... *H04N 5/23287* (2013.01); *H04N 5/23254* (2013.01)

(58) Field of Classification Search
CPC .................. H04N 5/23287; H04N 5/23254
See application file for complete search history.

(56) References Cited

U.S. PATENT DOCUMENTS

| | | | | |
|---|---|---|---|---|
| 2010/0202663 A1* | 8/2010 | Kim | ............. | G06K 9/00355 382/107 |
| 2015/0016683 A1* | 1/2015 | Kinoshita | ......... | H04N 5/23219 382/103 |

FOREIGN PATENT DOCUMENTS

JP    2006-317848 A    11/2006

* cited by examiner

*Primary Examiner* — Mekonnen D Dagnew
(74) *Attorney, Agent, or Firm* — Cowan, Liebowitz & Latman, P.C.

(57) ABSTRACT

A difference between a movement represented by a signal representing a movement of an image capture apparatus and each of motion vectors detected between images is calculated. Then, a motion vector determined to have a temporal variation in the difference smaller than a preset threshold value is determined as a background area motion vector. Also, from among motion vectors other than the background area motion vector, a subject area motion vector is determined. Then, image stabilization is controlled based on the subject area motion vector. It is thereby possible to enhance the accuracy of distinguishing motion vectors.

11 Claims, 11 Drawing Sheets

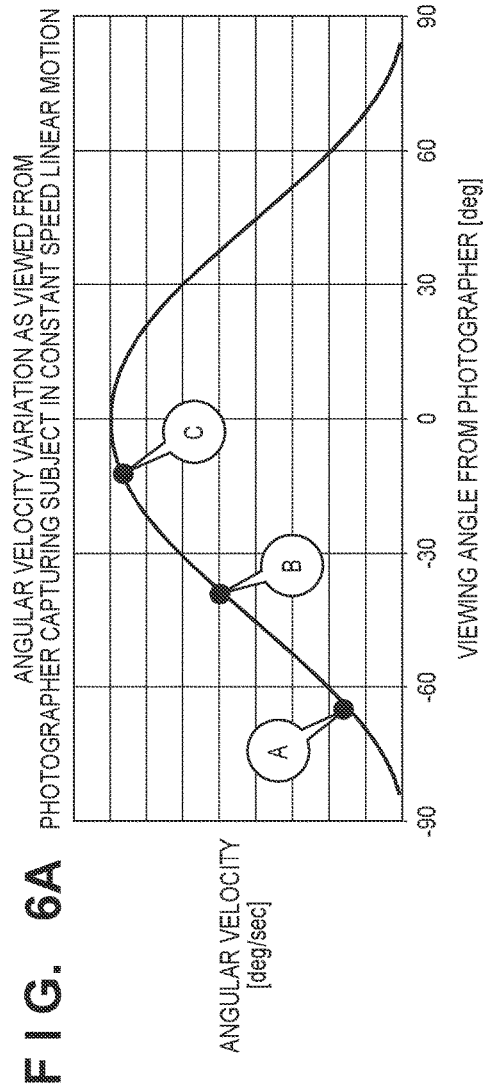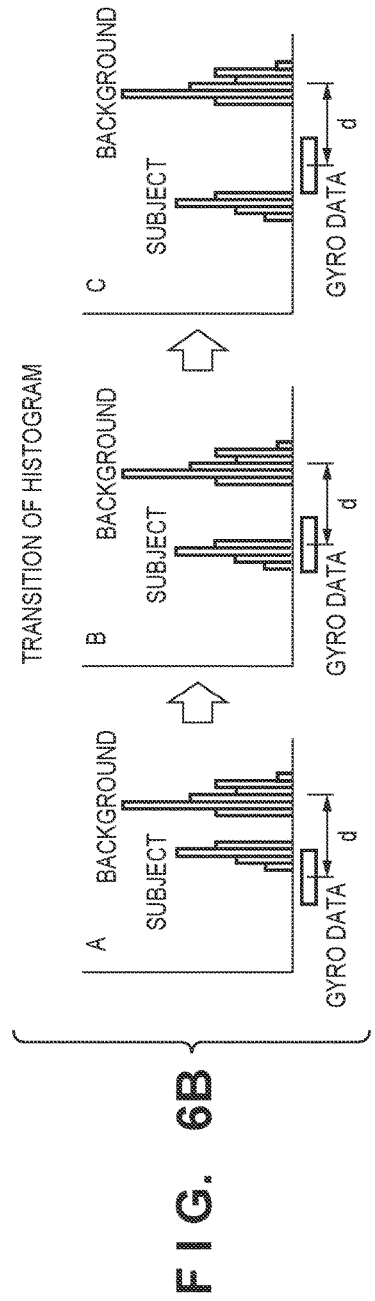
FIG. 6A
FIG. 6B

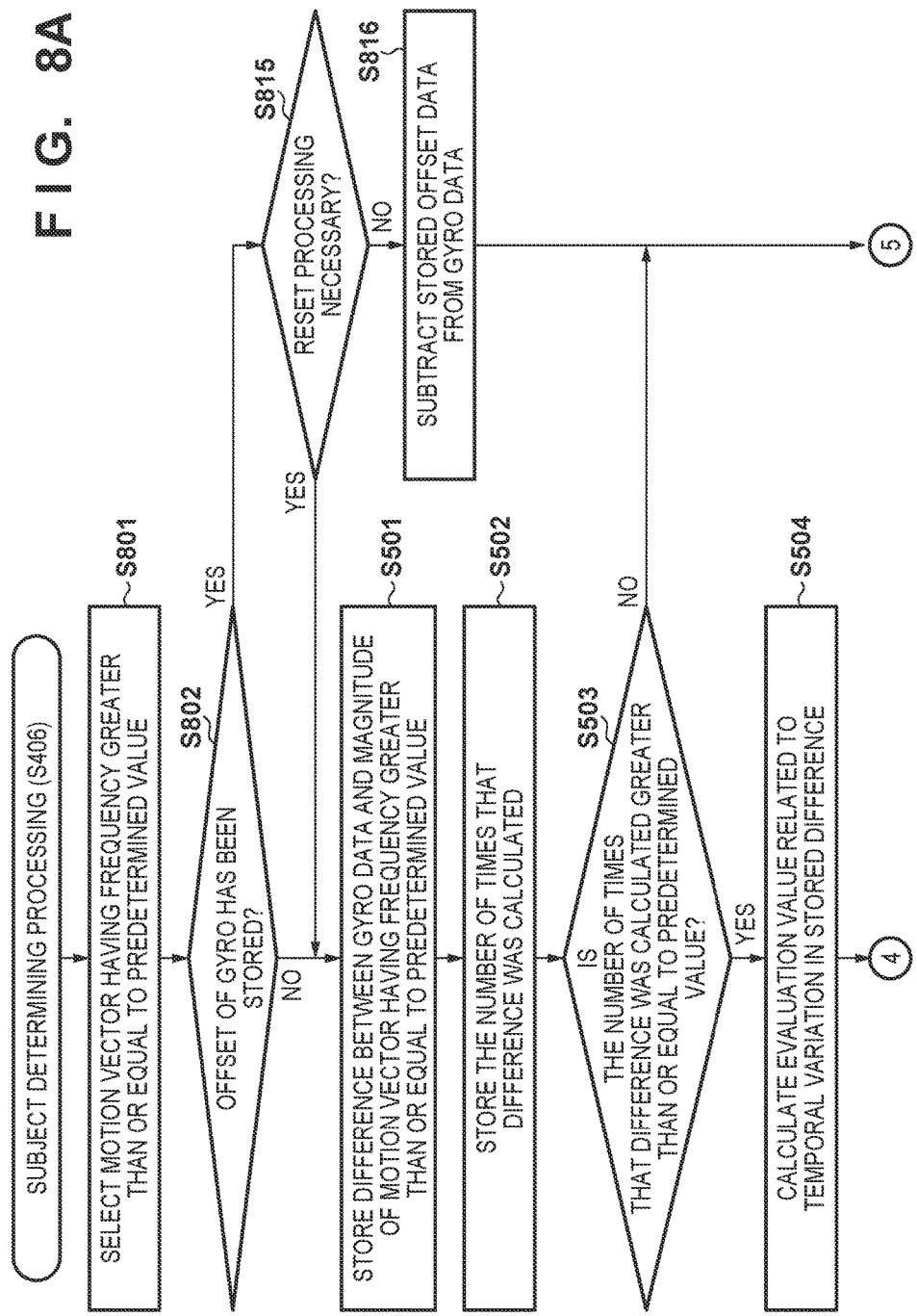

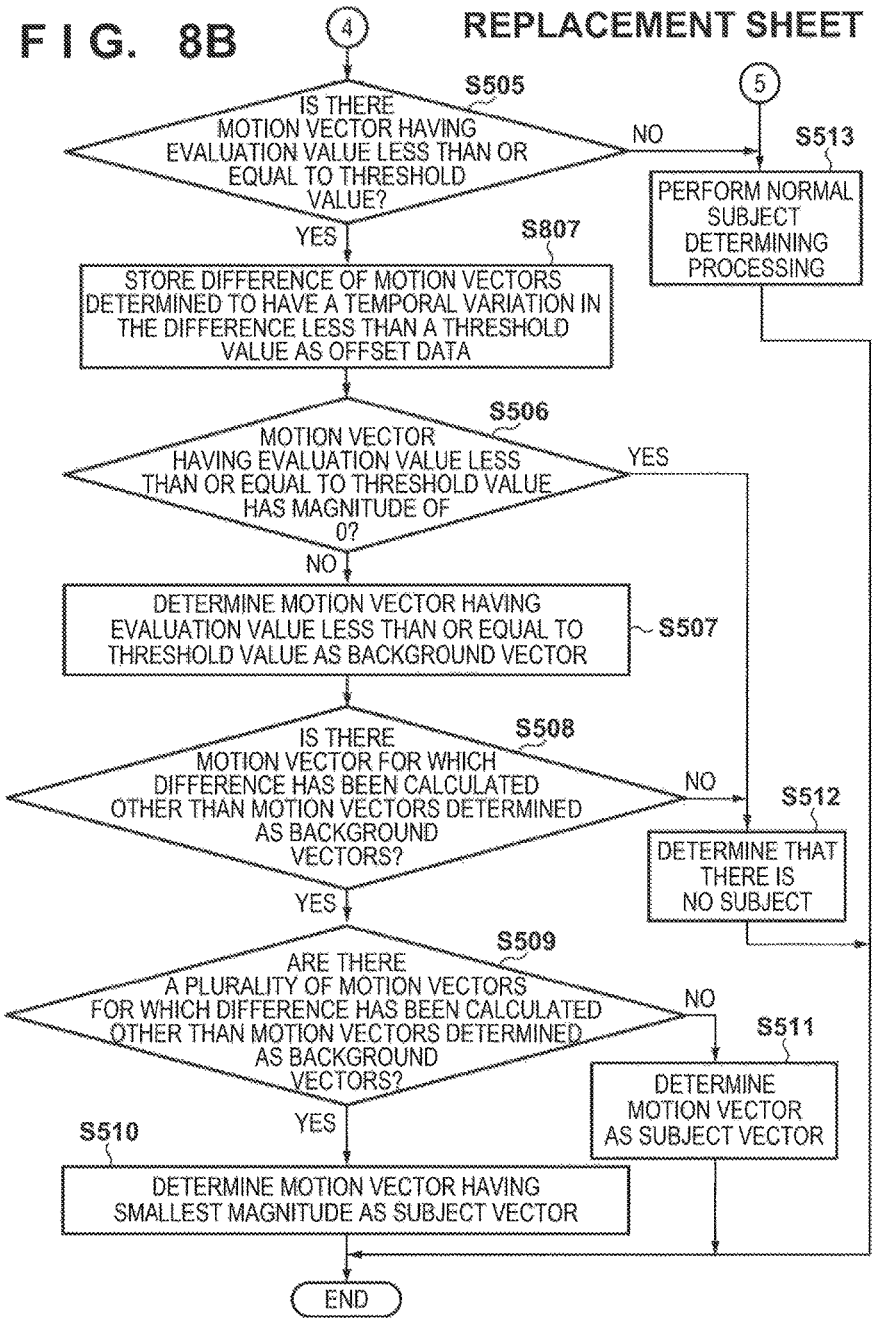

IMAGE STABILIZATION APPARATUS, CONTROL METHOD THEREOF, AND IMAGE CAPTURE APPARATUS

BACKGROUND OF THE INVENTION

Field of the Invention

The present invention generally relates to an image stabilization apparatus that can be equipped in an optical device such as a camera, a control method thereof, and an image capture apparatus.

Description of the Related Art

Panning is a photography technique that represents a sense of speed of a moving object. For successful panning, the photographer must pan the camera along with the movement of the subject on the imaging plane during exposure, but this is not easy.

For this reason, a panning assistance function is proposed in, for example, Japanese Patent Laid-Open No. 2006-317848 that is implemented by application of an image stabilization technique. The panning assistance function according to Japanese Patent Laid-Open No. 2006-317848 suppresses image blurring of a moving subject by driving a shift lens for image stabilization so as to correct the movement difference between the moving subject and the camera based on motion vectors detected from captured images while the camera is panning.

In the panning assistance function as described above, it is necessary to distinguish between a subject area that needs to be stationary and a background area. According to Japanese Patent Laid-Open No. 2006-317848, an area having motion vectors smaller than those of the surroundings is detected as the subject area, and the motion vectors in the subject area (subject vectors) are used to detect a movement difference between the moving subject and the camera.

On the other hand, the magnitude of a movement represented by a signal representing a device movement output by an angular velocity sensor (for example, gyroscopic sensor) or the like, which is provided in the camera or a lens, in principle matches the magnitude of motion vectors in the background area (background vectors). For this reason, the background vectors can also be identified by using the signal output by the sensor. However, in the case where the difference between the subject vectors and the background vectors is small such as in the case where the panning speed is low, there is a possibility that the background vectors and the subject vectors may be erroneously detected due to the influence of an offset component included in the signal. The offset component can be reduced by applying, for example, a HPF to the output signal from the sensor so as to remove a DC component, but this reduces not only the offset component but also a frequency component related to panning, as a result of which the accuracy of measuring the panning speed is lowered.

SUMMARY OF THE INVENTION

The present invention is directed to enhance the accuracy of distinguishing motion vectors in an image stabilization apparatus that performs image stabilization by distinguishing between subject motion vectors and background motion vectors by using a signal representing a movement of an image capture apparatus, as well as in a method for controlling such an image stabilization apparatus.

According to an aspect of the present invention, there is provided an image stabilization apparatus comprising: an acquiring unit configured to acquire a signal representing a movement of an image capture apparatus; a detecting unit configured to detect motion vectors between images; a calculating unit configured to calculate a difference between the movement represented by the signal and each of the motion vectors; a determining unit configured to determine a motion vector determined to have a temporal variation in the difference smaller than a preset threshold value as a background area motion vector, and determine a subject area motion vector from motion vectors other than the motion vector determined as the background area motion vector among the motion vectors detected by the detecting unit; and a control unit configured to control a correction unit that performs image stabilization, based on the subject area motion vector.

According to another aspect of the present invention, there is provided an image capture apparatus comprising: an image sensor; and an image stabilization apparatus that comprises: an acquiring unit configured to acquire a signal representing a movement of the image capture apparatus; a detecting unit configured to detect motion vectors between images; a calculating unit configured to calculate a difference between the movement represented by the signal and each of the motion vectors; a determining unit configured to determine a motion vector determined to have a temporal variation in the difference smaller than a preset threshold value as a background area motion vector, and determine a subject area motion vector from motion vectors other than the motion vector determined as the background area motion vector among the motion vectors detected by the detecting unit; and a control unit configured to control a correction unit that performs image stabilization, based on the subject area motion vector, wherein the detecting unit detects the motion vectors between frame images of a moving image obtained by the image sensor, and the control unit controls the correction unit to perform the image stabilization during an exposure period for capturing a still image.

According to a further aspect of the present invention, there is provided a method for controlling an image stabilization apparatus that is executed by the image stabilization apparatus, the method comprising: acquiring a signal representing a movement of an image capture apparatus; detecting motion vectors between images; calculating a difference between the movement represented by the signal and each of the motion vectors; determining a motion vector determined to have a temporal variation in the difference smaller than a preset threshold value as a background area motion vector, and determining a subject area motion vector from motion vectors other than the motion vector determined as the background area motion vector among the motion vectors detected in the detecting step; and controlling a correction unit that performs image stabilization, based on the subject area motion vector.

According to another aspect of the present invention, there is provided a non-transitory computer-readable medium storing a program for causing a computer provided in an image stabilization apparatus to function as: an acquiring unit configured to acquire a signal representing a movement of an image capture apparatus; a detecting unit configured to detect motion vectors between images; a calculating unit configured to calculate a difference between the movement represented by the signal and each of the motion vectors; a determining unit configured to determine a motion vector determined to have a temporal variation in the difference smaller than a preset threshold value as a background area motion vector, and determine a subject area motion vector from motion vectors other than the motion vector determined as the background area motion vector among the motion vectors detected by the detecting unit; and a control unit configured to control a correction unit that performs image stabilization, based on the subject area motion vector.

Further features of the present invention will become apparent from the following description of exemplary embodiments with reference to the attached drawings.

BRIEF DESCRIPTION OF THE DRAWINGS

FIGS. 6A and 6B are diagrams schematically showing a variation between the output of an angular velocity sensor and background vectors during panning.

FIGS. 8A and 8B are flowcharts of subject determining processing according to the second embodiment.

DESCRIPTION OF THE EMBODIMENTS

Exemplary embodiments of the present invention will now be described in detail in accordance with the accompanying drawings.

In the following, examples will be described in which an image stabilization apparatus according to an embodiment of the present invention is applied to a digital camera, but in the present invention, functions related to image capturing and recording of captured images are not essential. The present invention can be carried out in a plurality of images for detecting motion vectors and any electronic device or optical device that is capable of performing drive control of a movable member for suppressing image blurring (for example, shift lens). Non-limiting examples of the electronic device include image capture apparatuses such as a digital still camera, a video camera and a silver salt still camera, a personal computer, a game machine, a mobile phone, a personal digital assistant, a car navigation system, a drive recorder, a robot, and the like. Also, non-limiting examples of the optical device that can carry out the present invention include an interchangeable lens, an attachment lens, a pair of binoculars, a telescope, and the like. Also, the image stabilization apparatus may be an optical image stabilization apparatus that drives an image sensor or a shift lens, or may be an electronic image stabilization apparatus that controls pixel crop position. Alternatively, the image stabilization apparatus may be a combination of an optical image stabilization apparatus and an electronic image stabilization apparatus.

First Embodiment

Figure 1:
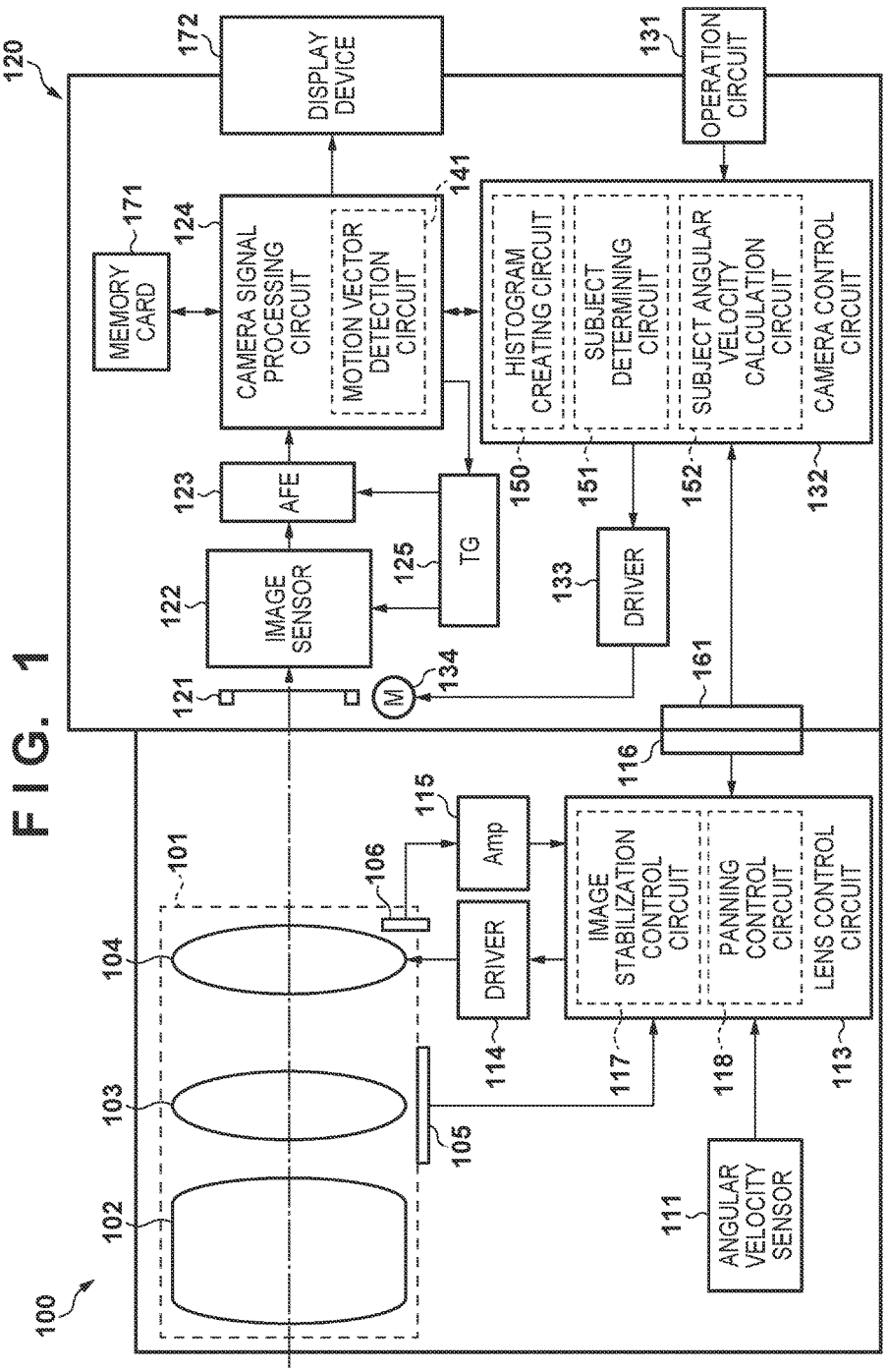
FIG. 1 is a block diagram showing an example of a functional configuration of a digital camera including an image stabilization apparatus according to a first embodiment.

FIG. 1 is a diagram showing an example of a configuration of a digital camera including an image stabilization apparatus according to a first embodiment of the present invention. Here, the digital camera is described as a lens interchangeable digital camera, but may be a lens built-in digital camera.

An interchangeable lens 100 having an image stabilization function is an optical device that can be attached or detached to and from a camera main body 120. The interchangeable lens 100 includes a lens unit 101 composed of a main image capturing optical system 102, a zoom lens 103 capable of changing the focal distance, and a shift lens 104.

A zoom encoder 105 detects the position of the zoom lens 103 and outputs a detection signal to a lens control circuit 113. The lens control circuit 113 includes, for example, a microcomputer, and controls the operations of the interchangeable lens 100 including the image stabilization function by the microcomputer executing a program stored in a memory. The lens control circuit 113 can obtain the focal distance of the lens unit 101 from the detection signal acquired from the zoom encoder 105. The lens control circuit 113 performs communication with a camera control circuit 132 provided in the camera main body 120 via mount contact circuits 116 and 161. The shift lens 104 is capable of movement in a direction perpendicular to the optical axis of the lens unit 101. As a result of the shift lens 104 being driven so as to cancel out a movement, image blurring is optically corrected.

An angular velocity sensor (hereinafter referred to as gyro) 111 detects a movement of devices (in this case, the camera main body 120 and the interchangeable lens 100), and outputs a movement signal representing the detected movement to the lens control circuit 113. The lens control circuit 113 A/D converts the movement signal and acquires the resultant as gyro data. The gyro 111 may be provided in the camera main body 120.

The lens control circuit 113 includes an image stabilization control circuit 117 that performs image stabilization control, and a panning control circuit 118 that performs panning assistance control. The image stabilization control circuit 117 and the panning control circuit 118 are implemented by a microprocessor included in the lens control circuit 113 executing a program.

The lens control circuit 113 also performs other control operations such as focus lens control and aperture control, but illustration is omitted for the sake of simplification. A driver 114 drives the shift lens 104 in a drive direction by a drive amount according to the control signal from the lens control circuit 113. The driver 114 constitutes an image stabilization circuit, together with the shift lens 104 serving as a correction member and a mechanical member (actuator or the like) for driving the shift lens 104.

An amplifier 115 amplifies the output of a positon sensor 106 for the shift lens 104, and outputs the resultant to the lens control circuit 113. The present embodiment is configured to perform movement detection and image stabilization about two perpendicular axes (for example, the horizontal direction and the vertical direction), but image stabilization can be carried out in the same manner for the different axes, and for this reason, hereinafter, image stabilization with respect to one axis will be described.

The camera main body 120 includes a shutter 121 that is used to exposure control, and an image sensor 122 such as a CMOS (complementary metal oxide semiconductor) sensor. An image signal output from the image sensor 122 is processed in an analog signal processing circuit 123, and thereafter transmitted to a camera signal processing circuit 124. A timing generator (TG) 125 sets an operation timing of the image sensor 122 and an operation timing of the analog signal processing circuit 123.

An operation circuit 131 is a group of input devices for the user to provide various types of input to the camera main body 120. The operation circuit 131 may include, for example, not only input devices that require physical operations such as a switch, a button, a lever, and a touch panel, but also input devices that receive speech input and gaze input. The operation circuit 131 includes, for example, a power switch, a release switch, a switch for switching whether or not to enable a panning assistance mode, and the like. Also, the operation circuit 131 includes a switch SW1 that is turned on by a release button being pressed halfway down, and a switch SW2 that is turned on by a release button being pressed fully. The release button is used to capture still images, and a moving image recording button may be provided separately so as to capture moving images.

An instruction to start an image capture preparation operation is issued by the switch SW1 being turned on. The image capture preparation operation includes autofocus (AF) processing and automatic exposure (AE) processing. The AE processing and the AF processing can be carried out by the camera control circuit 132 based on, for example, information obtained from live view display images.

An instruction to start an operation of capturing a recording image is issued by the switch SW2 being turned on. A generated recording image is encoded by the camera signal processing circuit 124 where necessary, thereafter stored in a data file of the recording format, and recorded in a memory card 171.

The camera control circuit 132 includes, for example, a microcomputer, and controls the overall operations of the camera main body 120 by the microcomputer executing a program stored in a memory. For example, the camera control circuit 132 outputs a control signal to a shutter driver 133, and drive controls a motor 134 for driving the shutter. The memory card 171 is a recording medium in which the data of captured images is recorded.

A display device 172 includes a display device such as a liquid crystal panel (LCD), functions as a viewfinder, and is used to display captured images. The camera main body 120 includes the mount contact circuit 161 that comes into contact with the interchangeable lens 100. The lens control circuit 113 and the camera control circuit 132 perform serial communication at a predetermined timing via the mount contact circuits 116 and 161.

The camera signal processing circuit 124 applies so-called developing processing such as white balance adjustment and demosaic processing to the image signal output by the analog signal processing circuit 123. The camera signal processing circuit 124 can also execute various types of image processing operations including signal format conversion such as RGB-to-YCbCr conversion, encoding and decoding according to the recording format, scaling up and down of images, combining of images, color tone adjustment, generation of AF evaluation value, and detection and recognition of a specific subject. A typical specific subject is a human face, and the recognition of a specific subject includes the recognition of a facial expression and the recognition of an individual, but the present invention is not limited thereto. The camera signal processing circuit 124 includes a motion vector detection circuit 141, and detects motion vectors on an area-to-area basis between a plurality of images captured at different timings.

As the method for detecting motion vectors between two frame images, a known template matching method can be used. One of two frame images that is used as the standard (for example, the frame image captured first) is set as a standard image, and the other frame image is set as a reference image. Then, a rectangular area having a predetermined size included in the standard image is set as a template frame, and in the reference image, for each template frame, a rectangular area larger than the template frame is set as a search range so as to calculate a correlation value. Motion vectors are thereby detected for each template frame.

The result of motion vector detection performed by the motion vector detection circuit 141 is output to the camera control circuit 132. Here, at least some of the functions of the camera signal processing circuit 124 may be implemented by hardware such as a FPGA or a ASIC, or may be implemented by, for example, a program executed by a processor included in the camera signal processing circuit 124.

The camera control circuit 132 includes a histogram creating circuit 150, a subject determining circuit 151, and a subject angular velocity calculation circuit 152 that calculates a camera panning angular velocity (hereinafter referred to as subject angular velocity) for causing a subject that needs to be stationary to be stationary during panning. The histogram creating circuit 150 generates, from the output of the motion vector detection circuit 141, a frequency distribution (histogram) for the magnitude of motion vectors.

The subject determining circuit 151 determines subject motion vectors (subject vectors) by using the motion vector histogram and the gyro data received from the lens control circuit 113. The subject angular velocity calculation circuit 152 converts the subject vectors determined by the subject determining circuit 151 to angular velocities. For conversion of motion vectors to angular velocities, the subject angular velocity calculation circuit 152 uses the focal distance of the lens unit 101, the image capture interval (or frame rate) of images used for motion vector detection, the pixel pitch of the image sensor 122, and the like. The subject angular velocity calculation circuit 152 calculates a subject angular velocity based on the angular velocities obtained as a result of conversion and the received gyro data.

Upon the power switch of the operation circuit 131 being operated to power on the camera, the camera control circuit 132 detects the operation, and starts power supply to the constituent elements of the camera main body 120, and at the same time executes initial setting processing. Power supply to the interchangeable lens 100 via the mount contact circuits 161 and 116 also starts.

Upon start of power supply to the interchangeable lens 100, the lens control circuit 113 detects the start of power supply, and executes initial setting processing for the interchangeable lens 100. Then, the lens control circuit 113 and the camera control circuit 132 establish communication therebetween in accordance with a predetermined procedure. Through the communication between the lens and the camera, information regarding the state of the camera main body and settings for image capturing, and the like are transmitted from the camera main body 120 to the interchangeable lens 100. Also, information regarding the focal distance and aperture value of the interchangeable lens 100, gyro data, and the like are transmitted from the interchangeable lens 100 to the camera main body 120.

Furthermore, if the panning assistance function is enabled, information indicating that the panning assistance function is enabled, and information regarding the subject angular velocity calculated by the subject angular velocity calculation circuit 152 are transmitted from the camera main body 120 to the interchangeable lens 100. The lens control circuit 113 causes the panning control circuit 118 to execute drive control of the shift lens 104 if the panning assistance function is enabled, and causes the image stabilization control circuit 117 to execute drive control of the shift lens 104 if the panning assistance function is not enabled.

In FIG. 1, the camera control circuit 132, the camera signal processing circuit 124, and the lens control circuit 113 constitute the image stabilization apparatus. However, the camera control circuit 132 can also carry out the functions of the lens control circuit 113 that are related to image stabilization, and thus the image stabilization apparatus can also be constituted by the camera control circuit 132 and the camera signal processing circuit 124.

Figure 2:
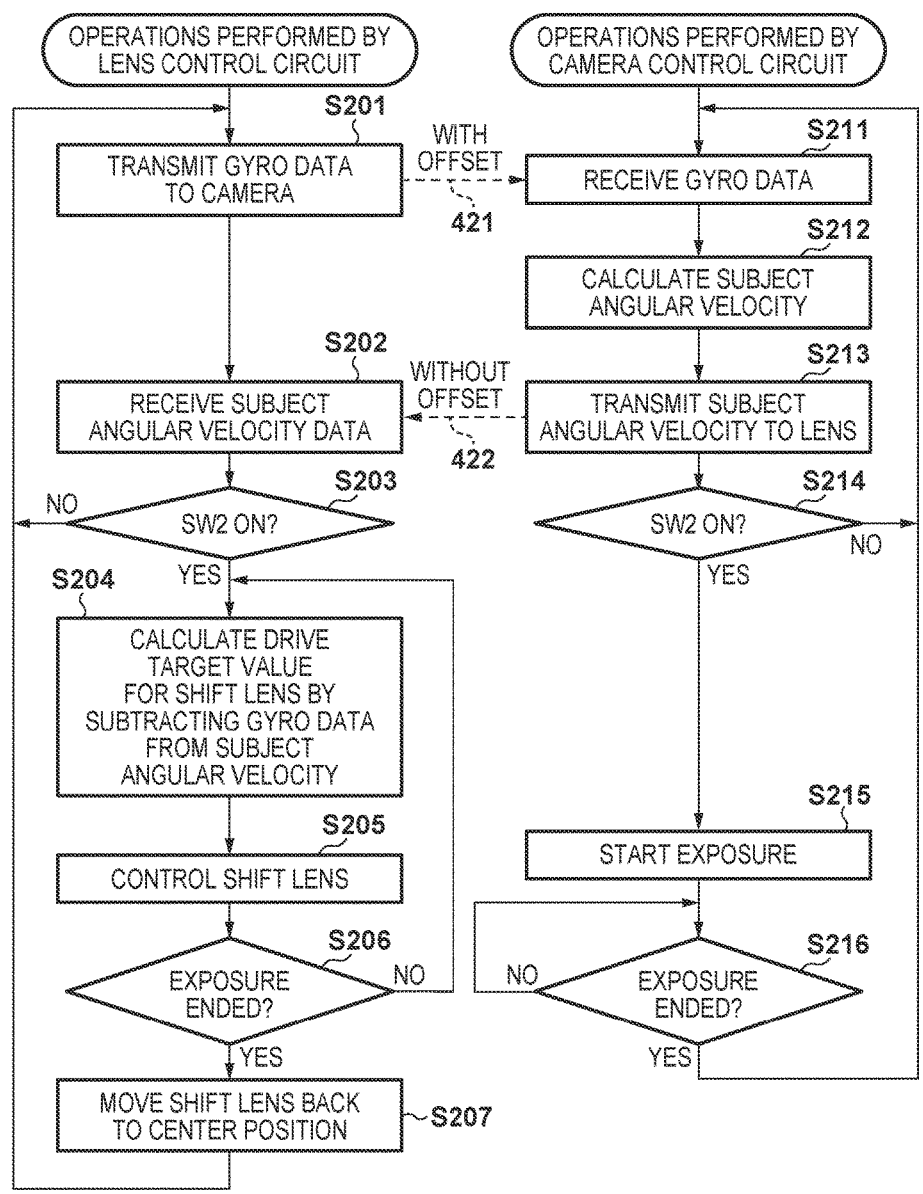
FIG. 2 is a flowchart of a panning assistance operation according to an embodiment.

FIG. 2 is a flowchart schematically illustrating operations performed by the lens control circuit 113 and the camera control circuit 132 when the panning assistance function is enabled. Here, steps S201 to S207 are operations performed in the lens control circuit 113, and steps S211 to S216 are operations performed in the camera control circuit 132. The digital camera according to the present embodiment is configured to, when it is in a stand-by state in a still image capturing mode, sequentially execute an operation of capturing a moving image and an operation of displaying the captured moving image and cause the display device 172 to function as a viewfinder. The processing shown in FIG. 2 can be executed in a state in which the camera is in a stand-by state in the still image capturing mode in which the panning assistance function is enabled and in a state in which the switch SW1 is on.

The lens control circuit 113 continuously performs sampling on the output of the angular velocity sensor (gyro) 111 at a sampling frequency of, for example, 4 kHz. In S201, the lens control circuit 113 transmits, to the camera, an average value of gyro data acquired during an elapsed period (t1 to t2) between capturing times (it is assumed here that the capturing times are t1 and t2) of two frame images on which the camera main body 120 performs motion vector detection. Gyro data 421 transmitted here includes an offset of the gyro 111.

In S211, the camera control circuit 132 receives the gyro data 421. In S212, the subject angular velocity calculation circuit 152 calculates a subject angular velocity from the gyro data received in S211 and the subject vector determined by the subject determining circuit 151, and transmits the subject angular velocity to the lens control circuit 113 in S213. The subject angular velocity 422 transmitted here includes an offset of the gyro 111.

In S202, the lens control circuit 113 receives the subject angular velocity 422 from the camera control circuit 132. The lens control circuit 113 repeatedly executes steps S201 to S202, and the camera control circuit 132 repeatedly executes steps S211 to S213 until an instruction to start still image capturing is detected (until the switch SW2 being turned on is detected) in S203 and S214. In FIG. 2, for the sake of convenience, the lens control circuit 113 is described to detect the switch SW2 being turned on, but in practice, the camera control circuit 132 provides a notification to the lens control circuit 113 upon detection of the switch SW2 being turned on in S214.

Upon detection of the switch SW2 being turned on, in S215, the camera control circuit 132 starts processing for still image capturing. The camera control circuit 132 drive controls the motor 134 via the driver 133, and opens the shutter 121 to start exposure of the image sensor 122.

Meanwhile, in S204, the lens control circuit 113 calculates a drive target value for the shift lens 104 by subtracting the current gyro data from the most recently received subject angular velocity. At the start of exposure, the lens control circuit 113 may drive the diaphragm provided in the lens unit.

In S205, the lens control circuit 113 outputs a drive signal based on the drive target value to the driver 114, and drives the shift lens 104. The lens control circuit 113 continuously executes the drive target value calculation in S204 and driving of the shift lens 104 in S205 until the exposure period for capturing a still image ends.

In S216, the camera control circuit 132 waits for the exposure period to end, and upon completion of the exposure period, closes the shutter 121, causes the processing to return to S211, and continues the operations in the stand-by state. Also, in S216, the camera control circuit 132 transmits a notification indicating that the exposure period has ended to the lens control circuit 113. In S207, upon receiving the notification indicating that the exposure period has ended, the lens control circuit 113 moves the shift lens 104 back to the center position.

In this way, when the panning assistance function is enabled, a movement difference between panning of the digital camera and the movement of the subject is corrected by the movement of the shift lens 104 so as to suppress image blurring of the subject area.

A problem to be solved by the present invention will now be described.

The gyro data used in the panning assistance function includes an offset of the gyro, and the subject angular velocity calculated based on the gyro data also includes an offset of the gyro. The drive target value for the shift lens 104 calculated in S204 is obtained by subtracting the gyro data including an offset from the subject angular velocity including an offset, and thus the drive target value does not include the offset. That is, even if the gyro data includes an offset, it does not affect the panning assistance operation.

However, the gyro data is used to distinguish between motion vectors of the subject (subject vectors) and motion vectors of the background (background vectors), and thus there may be an influence of an offset included in the gyro data. Particularly when the difference in magnitude between subject vectors and background vectors is small, such as in the case where the panning speed is low, background vectors may be erroneously determined as subject vectors due to the influence of the offset. If such an erroneous determination is made, the shift lens is driven so as to suppress the movement of the background, resulting in an image in which the subject is blurred while the background remains stationary.

Figure 3A:
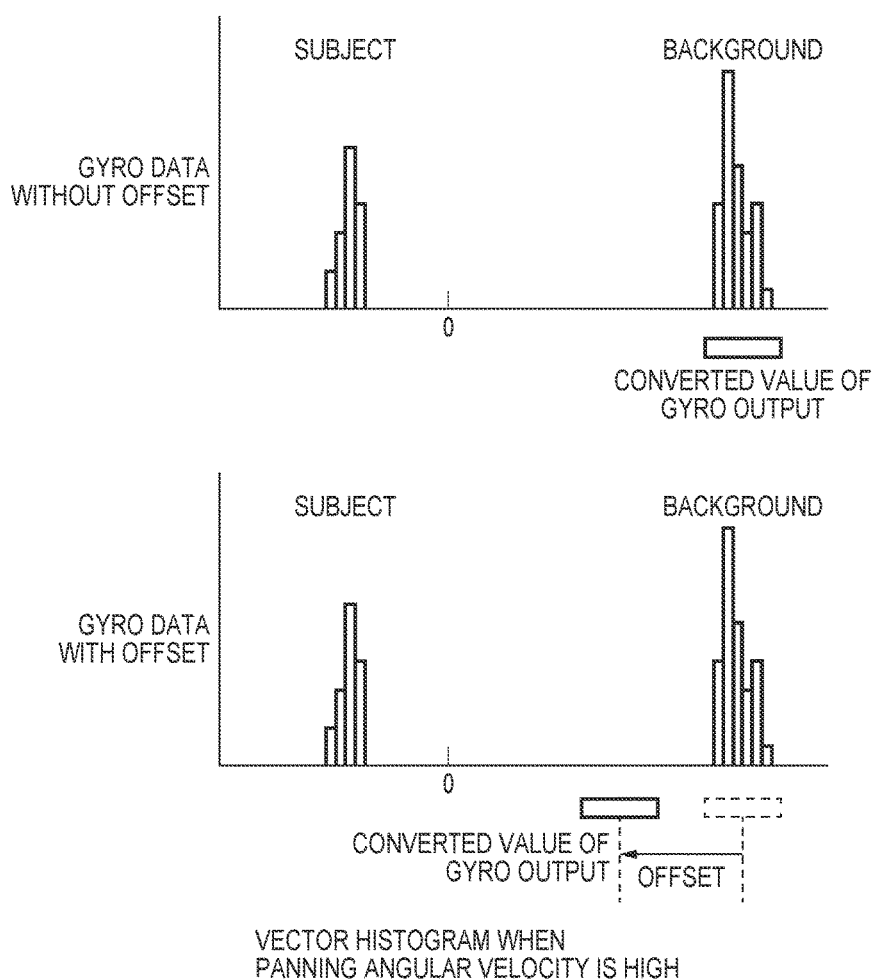
FIGS. 3A and 3B are diagrams illustrating erroneous distinguishment of motion vectors due to an offset component.
Figure 3B:
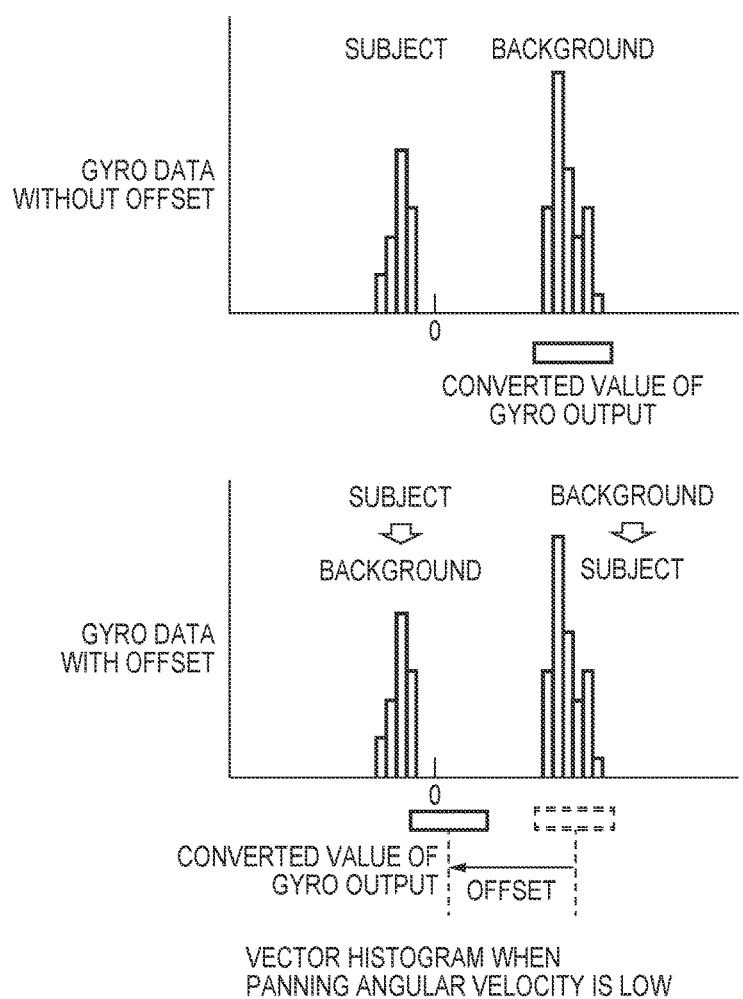

The erroneous determination described above will be explained in further detail with reference to FIGS. 3A and 3B. FIGS. 3A and 3B show examples of histograms representing frequency distributions for the magnitude of motion vectors in one axial direction, the histograms being generated by the histogram creating circuit 150 with respect to the motion vectors detected on an area-to-area basis by the motion vector detection circuit 141. FIG. 3A shows an example in which the panning speed is high (the subject angular velocity is large), and FIG. 3B shows an example in which the panning speed is low.

Also, FIGS. 3A and 3B each show a distribution range when an offset is included (top) and a distribution range when an offset is not included (bottom), the distribution ranges being distribution ranges of values obtained by converting gyro data measured during a period between the start point and the end point of capturing two images used for motion vector detection to the magnitude of motion vectors. When the panning speed is high, there is a large difference between background vectors and subject vectors. Accordingly, it can be seen from comparison between the distribution range obtained when the gyro data includes an offset and the distribution range obtained when the gyro data does not include an offset that there is no variation in a group of motion vectors close to the gyro data. For this reason, if, among the motion vectors, those having a large difference with respect to the gyro data and a magnitude close to 0 are determined as subject vectors, a correct determination can be made even if the gyro data includes an offset.

However, in the case where the panning speed is low, it can be seen from comparison between the distribution range obtained when the gyro data includes an offset and the distribution range obtained when the gyro data does not include an offset that the group of motion vectors having values close to the gyro data is different. In the example shown in FIG. 3B, in the distribution range obtained when the gyro data includes an offset, the motion vectors having a large difference with respect to the gyro data are background vectors, and thus the background vectors are erroneously determined as subject vectors.

Figure 4:
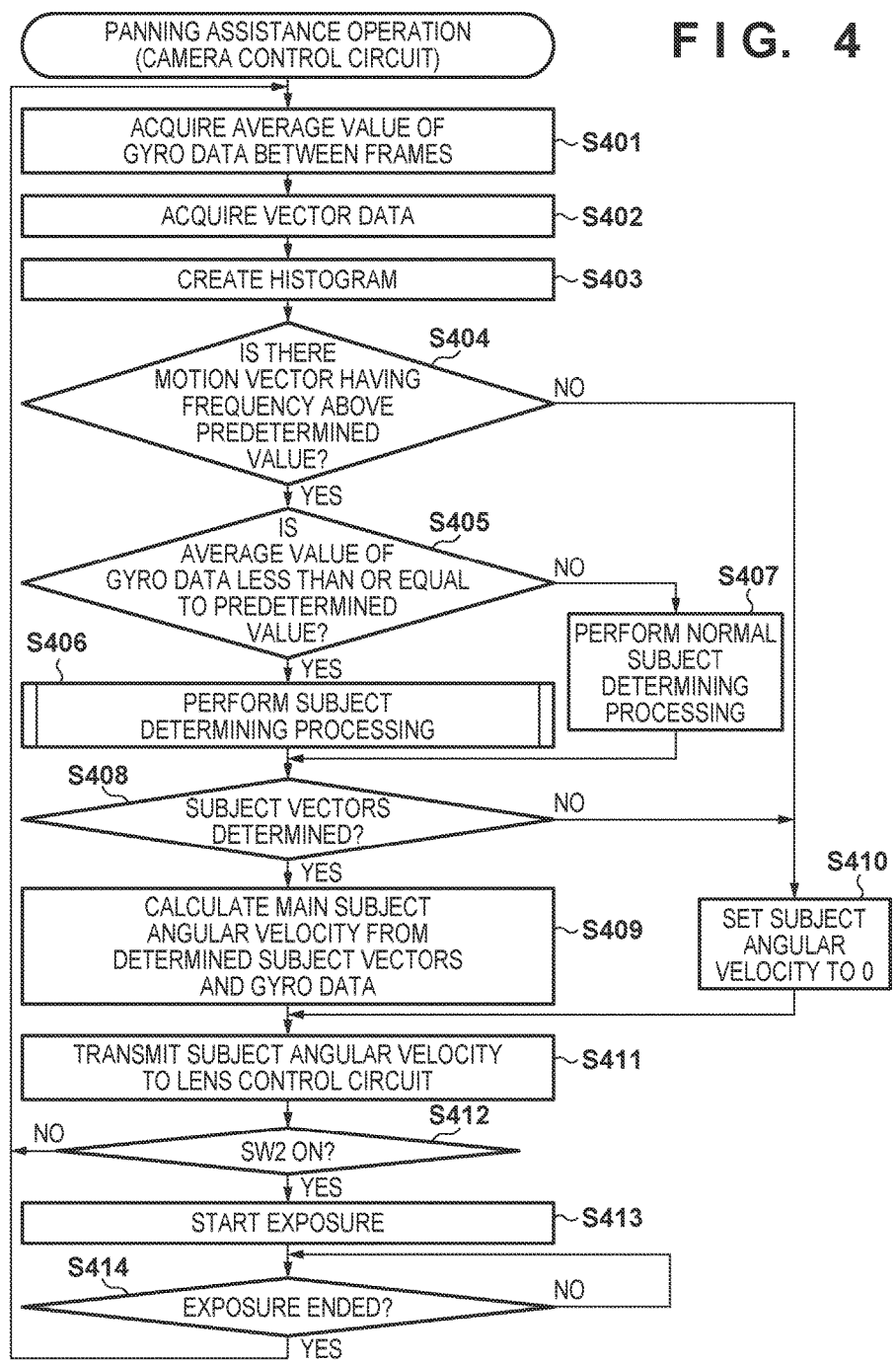
FIG. 4 is a flowchart of operations performed by a camera control circuit according to the first embodiment.

The present invention implements a correction determination even in a situation as shown in FIG. 3B. Hereinafter, a specific method will be described. FIG. 4 is a flowchart of a panning assistance operation performed by the camera control circuit 132.

In S401, the camera control circuit 132 acquires, from the lens control circuit 113, the level (here, average value) of gyro data measured between the previous frame and the current frame to be used for motion vector detection. The reason that the average value is used is to match the timing of motion vector detection and the timing gyro data detection.

In S402, the camera control circuit 132 acquires the data of motion vectors detected by the motion vector detection circuit 141 of the camera signal processing circuit 124.

In S403, the camera control circuit 132 (the histogram creating circuit 150) creates a histogram for the magnitude of motion vectors.

In S404, the camera control circuit 132 determines whether there is a motion vector having a frequency above a predetermined value (whether there is a peak in the frequency) in the histogram created in S403. The camera control circuit 132 causes the processing to proceed to S405 if it is determined that there is a motion vector having a frequency above a predetermined value, and otherwise causes the processing to proceed to S410.

In S405, the camera control circuit 132 determines whether the average value of gyro data acquired in S401 is less than or equal to a predetermined value, and causes the processing to proceed to S406 if it is determined that the average value is less than or equal to a predetermined value, and otherwise causes the processing to proceed to S407. The predetermined value used here can be, for example, a value having a sufficient difference in magnitude with respect to subject vectors and background vectors, and corresponding to a panning speed at which it is determined that the above-described erroneous determination will not be made even if the gyro data includes an offset of the gyro 111.

In S406, the camera control circuit 132 (the subject determining circuit 151) executes subject determining processing so as to determine subject vectors from the motion vectors detected by the motion vector detection circuit 141, and causes the processing to proceed to S408. The subject determining processing will be described later in detail with reference to FIGS. 5A and 5B.

In S407, the camera control circuit 132 executes normal subject determining processing, and causes the processing to proceed to S408. To be specific, if the camera control circuit 132 finds, among motion vectors whose frequency has a peak value, a motion vector having a large difference with respect to the average value of gyro data and having a magnitude close to 0, the camera control circuit 132 determines the motion vector as a subject vector. Because the average value of gyro data is not determined to be less than or equal to a predetermined value when the panning speed is high, a correct determination can be made by performing normal determination processing even if the gyro data includes an offset.

If there are a plurality of motion vectors whose frequency has a peak value, either of the following can be selected as appropriate: to determine a motion vector having a magnitude closest to 0 as a subject vector; or to determine a motion vector having a magnitude less than a predetermined value and the highest peak value as a subject vector. Also, in the histogram, if the frequency of a plurality of adjacent bins exceeds a predetermined value, their average value may be determined as a subject vector.

In S408, the camera control circuit 132 determines whether subject vectors have been determined in S406 or S407, and causes the processing to proceed to S409 if it is determined that subject vectors have been determined, and otherwise causes the processing to proceed to S410.

In S409, the camera control circuit 132 (the subject angular velocity calculation circuit 152) calculates a subject angular velocity from the subject vector determined in S406 or S407 and the average value of gyro data acquired in S401, and causes the processing to proceed to S411.

In S410, the camera control circuit 132 sets the subject angular velocity to 0, and causes the processing to proceed to S411. When the subject angular velocity is 0, the lens control circuit 113 executes a normal image stabilization operation even when the panning assistance function is enabled.

Here, the processing with respect to one axial direction has been described, but in practice, the processing from S403 to S410 is performed for each of the plurality of axes, and the subject angular velocity is calculated for each axis. In S411, the camera control circuit 132 transmits the calculated subject angular velocity to the lens control circuit 113.

In S412, the camera control circuit 132 determines whether the switch SW2 is on, and causes the processing to proceed to S413 if it is determined that the switch SW2 is on, otherwise causes the processing to return to S401, and then repeatedly executes the processing from S401 to S411.

In S413, the camera control circuit 132 starts processing for capturing a recording image. The camera control circuit 132 drive controls the motor 134 via the driver 133, and opens the shutter 121 to start exposure of the image sensor 122.

In S414, the camera control circuit 132 waits for an exposure period to elapse, and causes the processing to return to S401 after the exposure period elapses. Also, the camera control circuit 132 performs control so as to generate and record recording image data.

Figure 5A:
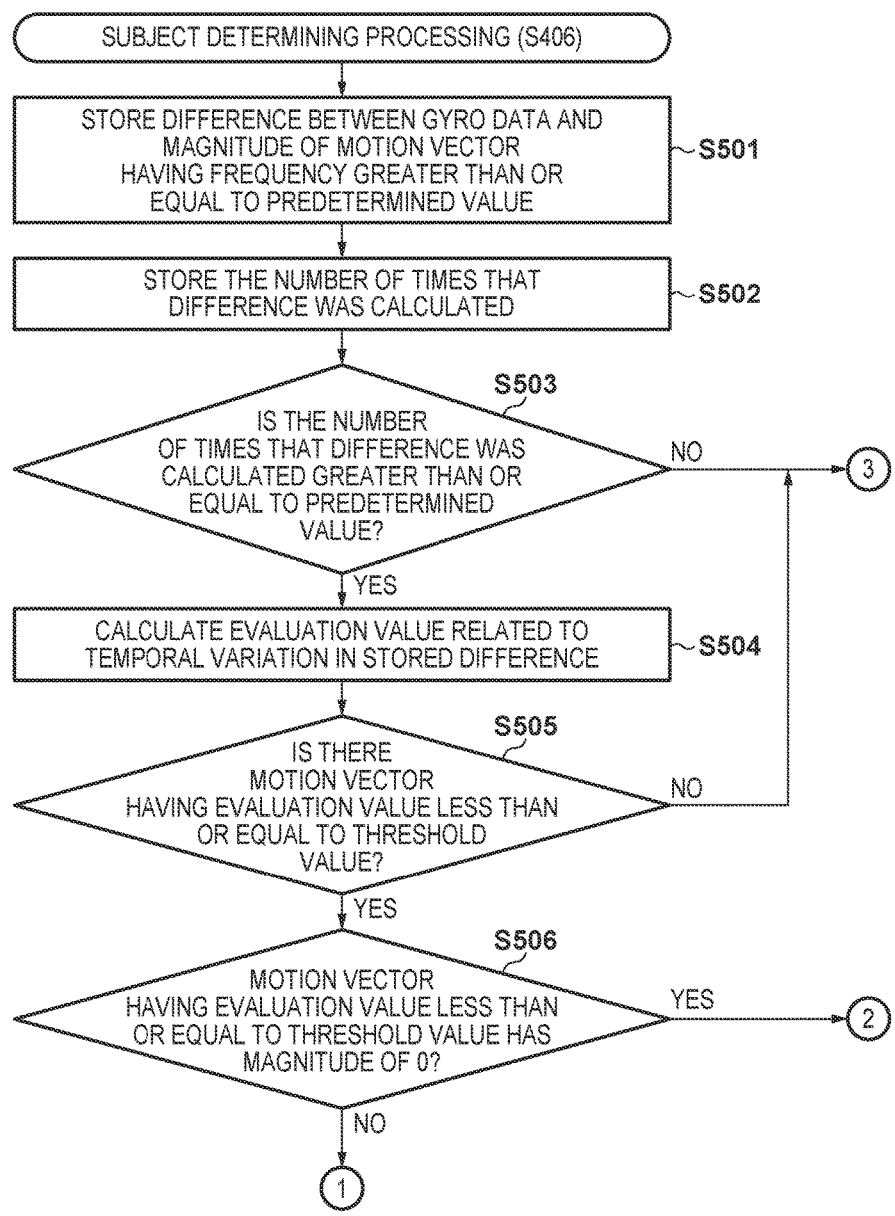
FIGS. 5A and 5B are flowcharts of subject determining processing according to the first embodiment.
Figure 5B:
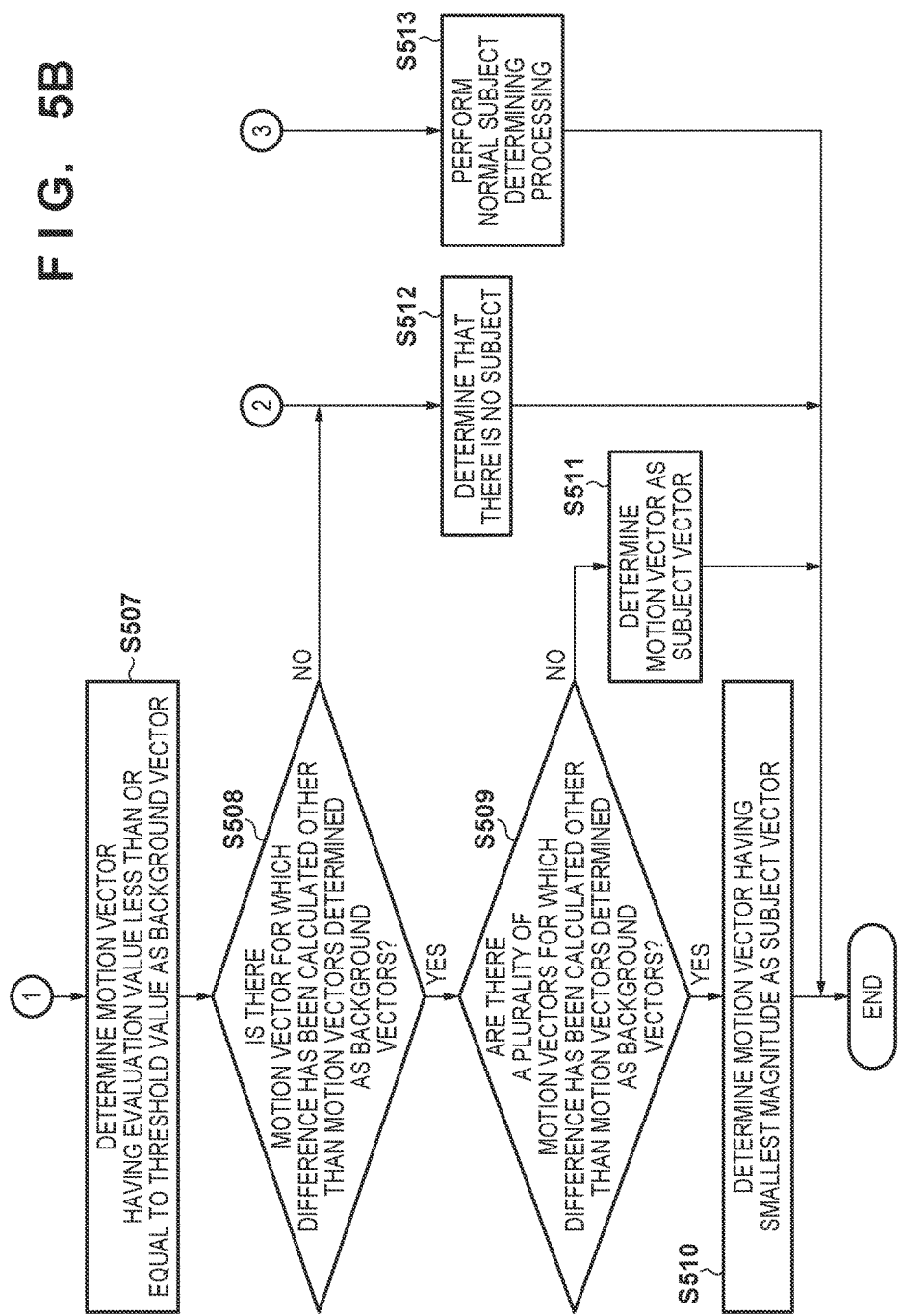

Next, a description will be given of the subject determining processing carried out in S406 when the panning speed is low (when the average value of gyro data is less than or equal to a predetermined value) with reference to the flowcharts shown in FIGS. 5A and 5B.

In S501, the camera control circuit 132 (the subject determining circuit 151) calculates, using the histogram generated in S403, a difference between the average value of gyro data acquired in S401 and each of the motion vectors that have an appearance frequency greater than or equal to a predetermined value, and stores the calculated difference in a memory. The subject determining circuit 151 calculates the difference by converting a motion vector to an angular velocity or converting the gyro data to a magnitude of movement.

In S502, the subject determining circuit 151 stores the number of times that the difference was calculated (the number of times that S501 was executed) in a memory.

In S503, the subject determining circuit 151 determines whether the number of times that the difference was calculated which was stored in the memory is greater than or equal to a predetermined value, and causes the processing to proceed to S504 if it is determined that the number of times that the difference was calculated is greater than or equal to a predetermined value, and otherwise causes the processing to proceed to S513.

In S504, the subject determining circuit 151 calculates, for each motion vector, an evaluation value related to a temporal variation in the difference stored in the memory. There is no limitation on the type of evaluation value, but the evaluation value may be, for example, a difference between the maximum value and the minimum value of the difference, a difference variance, or the like. The magnitude of motion vectors having a frequency greater than or equal to a predetermined value may vary along with the time. For this reason, when the difference is not calculated for motion vectors having the same magnitude, a temporal variation in the difference can be evaluated by regarding motion vectors having a magnitude difference within a predetermined range as the same motion vectors.

In S505, the subject determining circuit 151 determines whether there is a motion vector having a temporal variation in the difference less than a threshold value. As the threshold value, a value with which it is determined that the temporal variation in the difference is sufficiently small can be set as appropriate according to the evaluation value. The subject determining circuit 151 causes the processing to proceed to S506 if it is determined that there is any motion vector having a temporal variation in the difference less than a threshold value, and otherwise causes the processing to proceed to S513.

The processing from S504 to S505 may be performed by another method. For example, if a difference that has a difference with respect to the difference calculated this time less than or equal to a threshold value is continuously calculated a predetermined number of times, motion vectors corresponding to the difference calculated this time may be determined as motion vectors having a temporal variation in the difference less than a threshold value.

In S513, the subject determining circuit 151 executes normal subject determining processing as in S407, and ends the subject determining processing.

In S506, the subject determining circuit 151 determines whether the motion vector having a temporal variation in the difference less than a threshold value has a magnitude of 0, and causes the processing to proceed to S512 if it is determined that the motion vector having a temporal variation in the difference less than a threshold value has a magnitude of 0, and otherwise causes the processing to proceed to S507.

In S507, the subject determining circuit 151 determines a motion vector having a temporal variation in the difference less than a threshold value and a magnitude that is not 0 as a background vector, and causes the processing to proceed to S508.

FIG. 6A shows a relationship between viewing angle from the photographer and apparent angular velocity for a subject moving from the left to the right at a constant speed. Also, FIG. 6B schematically shows a relationship between motion vectors detected at time points A, B and C shown in FIG. 6A and the magnitude of the movement represented by the gyro data. As shown in FIGS. 6A and 6B, when the subject passes by in front of the photographer, the difference between background vectors and subject vectors vary whereas the difference (d in FIG. 6B) between the magnitude of the movement represented by the gyro data including an offset and the magnitude of background vectors remains the same. For this reason, motion vectors having a magnitude in which the temporal variation in the difference with respect to the magnitude of the movement represented by the gyro data is sufficiently small can be determined as background vectors.

In S508, the subject determining circuit 151 determines whether or not there is a motion vector for which the difference has been calculated, other than the motion vectors determined as background vectors in S507, and causes the processing to proceed to S509 if it is determined that there is a motion vector for which the difference has been calculated, and otherwise causes the processing to proceed to S512.

In S512, the subject determining circuit 151 determines that there is no subject, and ends the subject determining processing. S512 is executed either when panning is not performed (YES in S506) or when there is no subject vector (NO in S508).

In S509, the subject determining circuit 151 determines whether there are a plurality of motion vectors for which the difference has been calculated, other than the motion vectors determined as the background vectors, and causes the processing to proceed to S510 if it is determined that there are a plurality of motion vectors for which the difference has been calculated, and otherwise causes the processing to proceed to S511.

In S510, the subject determining circuit 151 determines, among the plurality of motion vectors for which the difference has been calculated (or in other words, motion vectors having a frequency greater than or equal to a predetermined value), a motion vector having a magnitude closest to 0 (smallest magnitude) as a subject vector, and ends the subject determining processing.

Also, in S511, the subject determining circuit 151 determines, as a subject vector, a motion vector for which the difference has been calculated (or in other words, a motion vector having a frequency greater than or equal to a predetermined value), other than the motion vectors determined as background vectors, and ends the subject determining processing.

In the subject determining processing carried out in S406, the determination of motion vectors based on the temporal variation in the difference is not performed during a period from the start of operation until the difference is calculated a predetermined number of times, but after the difference is calculated a predetermined number of times, the determination of motion vectors is possible based on a difference obtained by calculation the most recent predetermined number of times.

As described above, the present embodiment is configured such that background area motion vectors are determined based on the temporal variation in the difference between the magnitude of a plurality of motion vectors detected between images and the magnitude of the movement represented by the output of the sensor that detects a movement of an image capture apparatus. With this configuration, even when the sensor output includes an offset, background area motion vectors can be determined with high accuracy. Accordingly, it is possible to suppress erroneous determination of background area motion vectors as subject area motion vectors, and the panning assistance function for a subject intended by the user can be implemented.

The present embodiment is configured to carry out determination of motion vectors based on the temporal variation in the difference only when it is determined that the movement of the device is slow, but may be configured to carry out determination of motion vectors based on the temporal variation in the difference regardless of the speed of the movement of the device.

Second Embodiment

A second embodiment of the present invention will be described. The present embodiment suppresses erroneous determination of motion vectors particularly when the panning time is short before image capturing.

Figure 7:
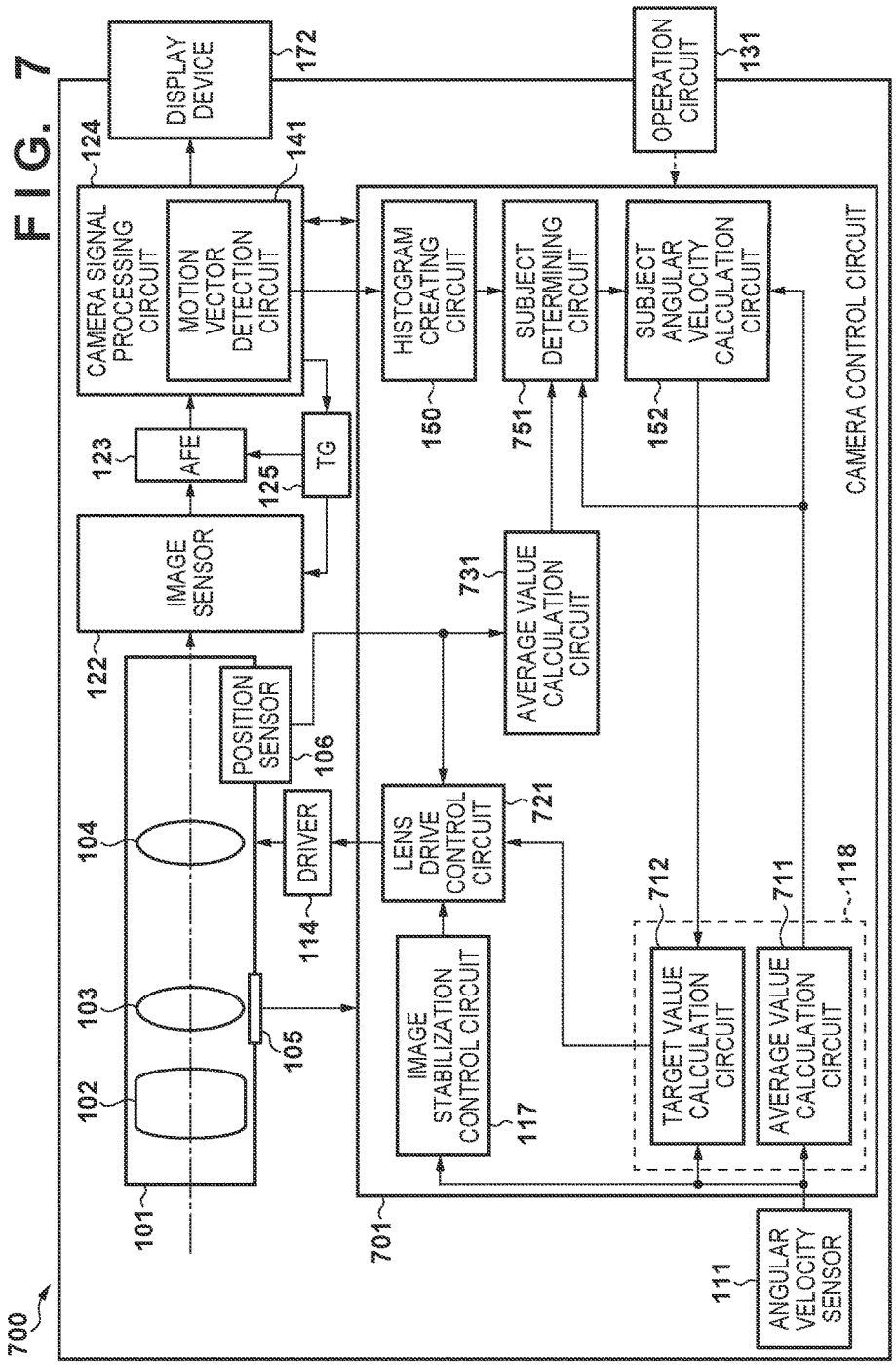
FIG. 7 is a block diagram showing an example of a functional configuration of a digital camera including an image stabilization apparatus according to a second embodiment.

FIG. 7 is a diagram showing an example of a configuration of a digital camera including an image stabilization apparatus according to a second embodiment of the present invention. A digital camera 700 according to the present embodiment is a lens built-in digital camera, but blocks that have the same functions as those of the first embodiment are given the same reference numerals as those used in FIG. 1, and a description thereof is omitted.

In the present embodiment, a camera control circuit 701 has a function corresponding to the lens control circuit 113 according to the first embodiment. FIG. 7 shows only functional blocks related to image stabilization and the panning assistance function among the functional blocks implemented by the camera control circuit 132. In the following description, as in the first embodiment, the operation of movement correction with respect to one axis will be described, but in practice, the same operation is carried out with respect to two axes or more. In FIG. 7, the camera control circuit 701 and the camera signal processing circuit 124 constitute the image stabilization apparatus.

An average value calculation circuit 711 calculates an average value of the output of the gyro 111 output between frames of a moving image. A target value calculation circuit 712 calculates a drive target value for the shift lens during panning assistance. The average value calculation circuit 711 and the target value calculation circuit 712 correspond to the panning control circuit 118 shown in FIG. 1.

A lens drive control circuit 721 drives the shift lens 104 based on the output of the image stabilization control circuit 117 while the camera is on stand-by to capture an image, and drives the shift lens 104 based on the output of the target value calculation circuit 712 during exposure. For this reason, in the digital camera 700, the image stabilization function is constantly in operation while the camera is on stand-by to capture an image.

An average value calculation circuit 731 calculates an average value of the output of the positon sensor 106 for the shift lens 104 output between frames of a moving image. The average value corresponds to the amount of movement of the shift lens.

A subject determining circuit 751 determines subject area motion vectors (subject vectors) from the motion vectors detected by the motion vector detection circuit 141. Then, the subject determining circuit 751 subtracts the average value calculated by the average value calculation circuit 731 from the determined subject vectors, and outputs the result of calculation to the subject angular velocity calculation circuit 152.

This is because, in the present embodiment, the image stabilization function is in operation while the camera is on stand-by to capture an image, and thus in the second embodiment, the difference between the panning speed and the subject angular velocity of the first embodiment corresponds to the result obtained by subtracting the amount of movement of the shift lens from the determined subject vectors.

FIGS. 8A and 8B are flowcharts of operations performed by the subject determining circuit 751 according to the second embodiment. The first embodiment is configured to execute normal subject determining processing unless it is determined that the panning speed is low, but the present embodiment is configured to execute the subject determining processing shown in FIGS. 8A and 8B regardless of the panning speed. Accordingly, in the panning assistance operation of the present embodiment, if it is determined in S404 of FIG. 4 that there is a motion vector having a frequency greater than or equal to a predetermined value, the following processing is executed instead of the processing from S405 to S407.

In S801, the subject determining circuit 751 selects a motion vector having a frequency greater than or equal to a predetermined value from the histogram created by the histogram creating circuit 150.

In S802, the subject determining circuit 751 determines whether the offset of the gyro 111 has been stored in a memory, and causes the processing to proceed to S815 if it is determined that the offset of the gyro 111 has been stored in a memory, and otherwise causes the processing to proceed to S501, and then performs the same processing as that from steps S501 to S505 in the first embodiment.

In S505, the subject determining circuit 151 determines whether there is any motion vector having a temporal variation in the difference less than a threshold value, and causes the processing to proceed to S807 if it is determined that there is such a motion vector, and otherwise causes the processing to proceed to S513.

In S807, the subject determining circuit 751 stores a difference of motion vectors determined to have a temporal variation in the difference less than a threshold value as offset data, and causes the processing to proceed to S506. The processing after this step is the same as that of the first embodiment.

In S815, the subject determining circuit 751 determines whether it is necessary to perform offset reset processing, and causes the processing to proceed to S501 if it is determined that it is necessary to perform offset reset processing, and otherwise causes the processing to proceed to S816. The subject determining circuit 751 can determine that it is necessary to perform reset processing, for example, when the power supply to the gyro 111 is turned off after the offset was stored, or when the elapse time after the offset was stored exceeds a predetermined length of time.

The offset is likely to vary depending on whether the user is moving the camera at the start of power supply to the gyro 111, and for this reason, if power supply is turned off and back on again after the offset was stored, the offset is reset and an offset is again acquired. Also, if the elapse time after the offset was stored is long, there is a possibility that the offset may drift due to temperature variation or the like, and therefore in this case as well, an offset is again acquired.

In S816, the subject determining circuit 751 subtracts the stored offset data from the acquired gyro data so as to remove the offset component. The movement represented by the gyro data from which the offset component has been removed matches background area motion vectors, and thus the subject determining circuit 751 causes the processing to proceed to S513, and performs normal subject determining processing.

As described above, according to the present embodiment, by using the position information of the shift lens, even in a state in which the image stabilization function is in operation, the same effects as those of the first embodiment can be obtained.

Furthermore, the present embodiment is configured such that among a plurality of motion vectors detected between images, motion vectors having a constant difference between the magnitude and the movement represented by the output of the sensor that detects a movement of an image capture apparatus are detected, and the difference is stored as an offset component of the sensor. Accordingly, even when there is no sufficient time to obtain a panning angular velocity such as when the panning time is short before image capturing, the offset component can be removed from the sensor output, and subject vectors can be correctly determined. As a result, the accuracy of the panning assistance function can be enhanced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing circuit (CPU), micro processing circuit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-138903, filed on Jul. 13, 2016, which is hereby incorporated by reference herein in its entirety.

What is claimed is:

1. An image stabilization apparatus comprising:
at least one processor or circuit configured to perform the operations of the following units:
an acquiring unit configured to acquire a signal representing a movement of an image capture apparatus from an angular velocity sensor;
a detecting unit configured to detect motion vectors between images captured by an image sensor;
a calculating unit configured to calculate a difference between the movement represented by the signal and each of the motion vectors;
a determining unit configured to determine a motion vector determined to have a temporal variation in the difference smaller than a preset threshold value as a background area motion vector, and determine a subject area motion vector from motion vectors other than the motion vector determined as the background area motion vector among the motion vectors detected by the detecting unit; and
a control unit configured to control a correction unit that performs image stabilization, based on the subject area motion vector, so that an image of subject is to be stationary in a still image captured while the image capture apparatus is panning.

2. The image stabilization apparatus according to claim 1, wherein when the motion vector determined to have a temporal variation in the difference smaller than a preset threshold value has a magnitude that is not 0, the determining unit determines the motion vector as the background area motion vector.

3. The image stabilization apparatus according to claim 1, wherein the determining unit performs determination of the background area motion vector when the signal has a level less than or equal to a predetermined value, and performs determination of the subject area motion vector based on a magnitude frequency of the motion vector and a magnitude of the movement represented by the signal, without performing determination of the background area motion vector when the signal does not have a level less than or equal to the predetermined value.

4. The image stabilization apparatus according to claim 1, wherein the determining unit determines the background area motion vector and the subject area motion vector from motion vectors that have a magnitude frequency greater than or equal to a predetermined value among the motion vectors detected by the detecting unit.

5. The image stabilization apparatus according to claim 4, wherein when there are a plurality of motion vectors that have the magnitude frequency greater than or equal to a predetermined value other than the motion vector determined as the background area motion vector among the motion vectors detected by the detecting unit, the determining unit determines a motion vector that has a smallest magnitude as the subject area motion vector.

6. The image stabilization apparatus according to claim 1, wherein the determining unit stores the difference for the motion vector determined to have a temporal variation in the difference smaller than a preset threshold value as an offset component of a sensor that outputs the signal.

7. The image stabilization apparatus according to claim 6, wherein when the offset component is stored, the determining unit determines the subject area motion vector based on a magnitude frequency of the motion vector and a magnitude of the movement represented by the signal from which the offset component has been removed, without performing determination of the background area motion vector.

8. An image capture apparatus comprising:
an image sensor; and
an image stabilization apparatus that comprises:
at least one processor or circuit configured to perform the operations of the following units:
an acquiring unit configured to acquire a signal representing a movement of the image capture apparatus from an angular velocity sensor;
a detecting unit configured to detect motion vectors between images captured by an image sensor;
a calculating unit configured to calculate a difference between the movement represented by the signal and each of the motion vectors;
a determining unit configured to determine a motion vector determined to have a temporal variation in the difference smaller than a preset threshold value as a background area motion vector, and determine a subject area motion vector from motion vectors other than the motion vector determined as the background area motion vector among the motion vectors detected by the detecting unit; and
a control unit configured to control a correction unit that performs image stabilization, based on the subject area motion vector,
wherein the detecting unit detects the motion vectors between frame images of a moving image obtained by the image sensor, and
the control unit controls the correction unit to perform the image stabilization during an exposure period for capturing a still image, so that an image of subject is to be stationary in a still image captured while the image capture apparatus is panning.

9. The image capture apparatus according to claim 8, wherein the control unit performs control so as to drive a lens for the image stabilization performed by the correction unit or the image sensor based on the subject area motion vector.

10. A method for controlling an image stabilization apparatus that is executed by the image stabilization apparatus, the method comprising:

acquiring a signal representing a movement of an image capture apparatus from an angular velocity sensor;
detecting motion vectors between images captured by an image sensor;
calculating a difference between the movement represented by the signal and each of the motion vectors;
determining a motion vector determined to have a temporal variation in the difference smaller than a preset threshold value as a background area motion vector, and determining a subject area motion vector from motion vectors other than the motion vector determined as the background area motion vector among the motion vectors detected in the detecting step; and
controlling a correction unit that performs image stabilization, based on the subject area motion vector, so that an image of subject is to be stationary in a still image captured while the image capture apparatus is panning.

11. A non-transitory computer-readable medium storing a program for causing a computer provided in an image stabilization apparatus to function as:
an acquiring unit configured to acquire a signal representing a movement of an image capture apparatus;
a detecting unit configured to detect motion vectors between images captured by an image sensor;
a calculating unit configured to calculate a difference between the movement represented by the signal and each of the motion vectors;
a determining unit configured to determine a motion vector determined to have a temporal variation in the difference smaller than a preset threshold value as a background area motion vector, and determine a subject area motion vector from motion vectors other than the motion vector determined as the background area motion vector among the motion vectors detected by the detecting unit; and
a control unit configured to control a correction unit that performs image stabilization, based on the subject area motion vector, so that an image of subject is to be stationary in a still image captured while the image capture apparatus is panning.

* * * * *